Patented Aug. 27, 1940

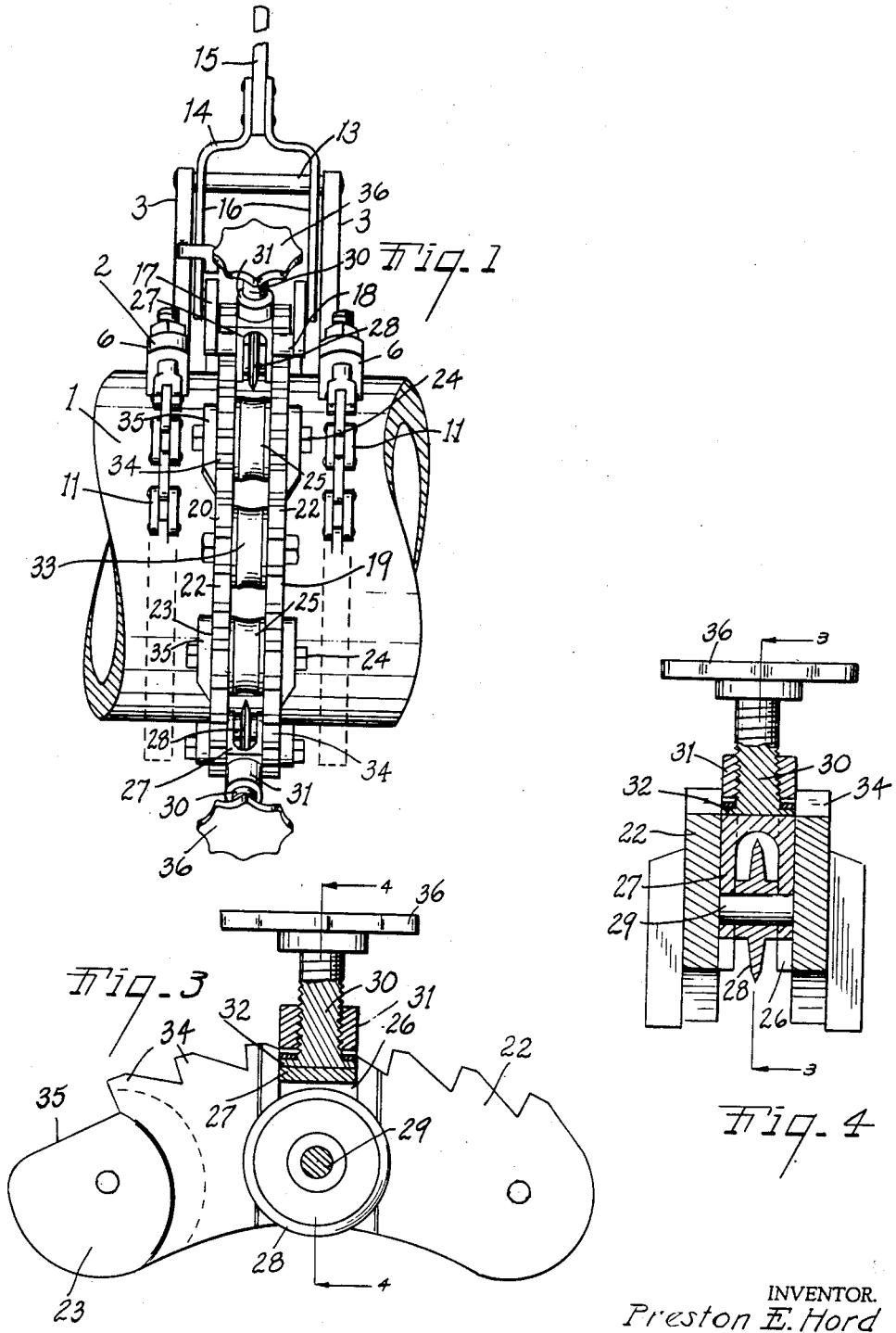

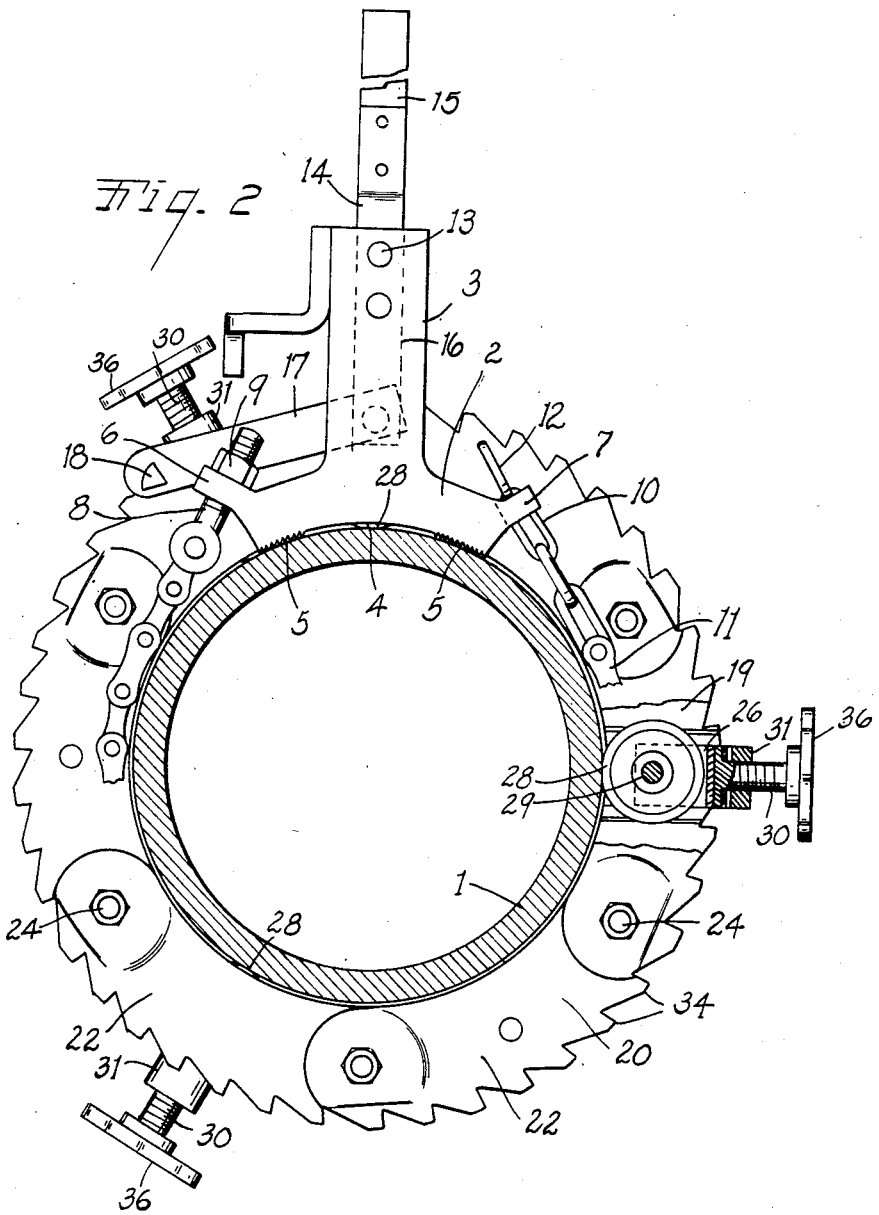

2,212,564

UNITED STATES PATENT OFFICE 2,212,564

PIPE CUTTER

Preston E. Hord, Kalamazoo, Mich.

Application July 5, 1938, Serial No. 217,519

7 Claims. (Cl. 30—98)

The main objects of this invention are:

First, to provide a novel pipe cutter adapted for quick attachment to a pipe.

Second, to provide a pipe cutter of the type described having a plurality of cutting elements and novel means for advancing the same radially against a pipe being cut.

Third, to provide a pipe cutter of the type described having means for clamping the same to pipes of different diameter and having a cutter assembly adapted to be indexed circumferentially of the pipe and means for advancing the latter circumferentially step by step and for progressively advancing the tools of the assembly relative to the work.

Fourth, to provide a pipe cutter having a cutting assembly adapted to be mounted for rotation relative to a pipe and including a plurality of cutting elements having novel means for feeding or advancing the same individually against the pipe during cutting thereof.

Objects relating to details and economies of the invention will appear from the description to follow. The invention is defined and pointed out in the claims.

A preferred embodiment of the invention is illustrated in the accompanying drawings, in which:

Fig. 1 is a view in elevation illustrating the cutter of my invention in operative relation on a fragment of pipe.

Fig. 2 is a side view illustrating details of the device, being partially broken away and in section to show the cutter advancing or feed mechanism constituting a feature of the invention.

Fig. 3 is an enlarged view illustrating a cutter carrying ratchet element of the invention, the view being in section on line 3—3 of Fig. 4.

Fig. 4 is a sectional view on line 4—4 of Fig. 3, illustrating details of construction of the cutter carrying ratchet element.

Referring to the drawings, reference numeral 1 indicates a pipe having the cutter device 2 of my invention operatively secured thereto. The said device consists of a pair of pipe engaging members or brackets 3 having arcuate inner surfaces 4 provided with oppositely disposed toothed or serrated feet 5 adapted to engage the exterior surface of the pipe 1. The members 3 carry oppositely extending ears 6, 7, the former of which are apertured to receive a forked draw bolt 8 upon which are threaded tightening nuts 9. The ears 7 of the brackets are forked to receive the links 10 each attached to a linked gripping member or chain generally designated 11, whereby a further anchoring link 12 articulated to link 10 will abut the ear 7. The said linked gripping members encircle the pipe to hold the bracket members 3 in place and may be tightened by adjustment of the nuts 9 in an obvious manner.

The pipe engaging brackets 3 carry a spindle 13 extending therebetween and this spindle serves as a pivot for a forked actuating lever 14 having a handle 15. The pawl members 17 are pivotally mounted on the lower ends of the arms 16 of the lever and are provided with the tooth engaging dog or member 18.

Between the chain gripping devices 11, I dispose the cutter assembly of my device which is generally designated 19. This assembly consists of a pair of spaced, generally circular ratchet members 20, each ratchet member being made up of a plurality of the arcuate or segmental ratchet elements 22 articulated at the ends thereof. These elements are overlapped with one another in the manner illustrated in Figs. 1 and 2 whereby in assembled relation to provide the generally circular ratchet members 20.

Each ratchet element 22 is apertured at 23 to receive a bolt or pin 24 articulating the same with a successive ratchet element 22 and likewise serving as a shaft for the concaved pipe engaging rollers 25. Certain of the elements 22 serve as cutter carrying elements and to this end they are provided with radially extending inner rectangular recesses 26 therein, the said recesses 26 of opposing elements 22 constituting rectangular slides or guideways for the forked journal members or bearing blocks 27 mounting the rotary cutters 28. Said cutters are journaled on axes 29 in the forked cutter bearing blocks as illustrated in Figs. 3 and 4.

For the purpose of advancing and retracting the cutters 28 radially of the pipe 1, I provide the screw threaded shifting members 30 each having a swivel foot 32 in engagement with the block 27 to advance and retract the latter in the slideway. The shifting members 30 are threadedly engaged in nut members 31 suitably attached to the opposing elements 22 above the block guiding slide recesses 26.

The alternate opposed ratchet elements 22 which are not provided with cutters as described have intermediate concaved pipe engaging rollers 33 journaled therebetween in the positions occupied by the cutters 28 in the cutter carrying elements. All of the ratchet members are provided with ratchet teeth 34 on their outer periphery and provision is made by recessing the elements 22 at 35 whereby the final ratchet tooth of one element will be spaced relative to the initial tooth of a succeeding element in the same manner as successive intermediate teeth of a given element, whereby the spacing of the teeth through the periphery of the ratchet assembly is uniform.

In operation, with the cutter assembly mounted on the pipe so that the rollers 25 are in rolling engagement with its periphery, the cutters 28 thereof are adjusted radially, by manipulation of knob or handle 36, to a depth sufficient to take a desired initial cut. Actuating lever 14 is then oscillated to advance the cutters peripherally of the pipe through one-third of a revolution, or 120°, since three cutters are shown in the illustrated embodiment. A conveniently disposed cutter is then advanced radially by manipulation of the knob 36 whereupon the handle 15 is again actuated to advance the cutters one-third of a revolution, following which the next cutter is fed radially against the work and so on until the pipe is severed.

In structure and operation my device is simple and very effective. By the expedient of providing a plurality of cutters, each of which has an independent adjustment, it is possible to advance the cutters peripherally step by step, and by making successive individual radial adjustments thereof relative to the work to greatly expedite the cutting of a pipe. So far as I am aware, this concept is novel with me.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A device for cutting pipe comprising a bracket member and means for fixedly securing the same to a pipe to be cut, a plurality of pairs of arcuate elements having ratchet teeth on the outer surface thereof, said elements having concaved pipe engaging rollers therebetween and being articulated at the axes of certain of said rollers to provide a generally circular ratchet assembly, certain of said elements being recessed to provide radially extending ways, rotary cutters having journal blocks therefor slidable in said ways, and means for individually adjusting said cutters relative to said ways to advance the cutters radially against the pipe, and means comprising an oscillating pawl pivotally mounted on said bracket member and engageable with said teeth for advancing said ratchet assembly circumferentially relative to the pipe.

2. A device for cutting pipe comprising a bracket member and means for fixedly securing the same to a pipe to be cut, a plurality of pairs of arcuate elements having concaved pipe engaging rollers therebetween and being articulated at the axes of certain of said rollers to provide a generally circular assembly, certain of said elements being recessed to provide radially extending ways, rotary cutters slidable in said ways, and means for individually adjusting said cutters relative to said ways to advance the cutters radially against the pipe, and means pivotally mounted on said bracket member and engageable with said ratchet teeth for advancing said assembly circumferentially relative to the pipe.

3. A device for cutting pipe comprising a plurality of pairs of arcuate elements having ratchet teeth on the outer surface thereof, successive pairs overlapping circumferentially, said elements having pipe engaging rollers therebetween and being articulated at the axes of certain of said rollers to provide a generally circular ratchet assembly, certain of said elements being recessed to provide radially extending ways, cutters having journals slidable in said ways, and means for individually adjusting said cutters in said ways to advance the cutters radially against the pipe, and means secured to said pipe for engaging said ratchet teeth and advancing said ratchet assembly circumferentially relative to the pipe.

4. A device for cutting pipe comprising a plurality of arcuate circumferentially overlapping elements having ratchet teeth on the outer surface thereof, said elements having pipe engaging rollers journaled therein and being articulated at the axes of said rollers to provide a generally circular ratchet assembly, certain of said elements being provided with radially extending ways, cutters having journals slidable in said ways, and means for individually adjusting said cutters in said ways to advance the cutters radially against the pipe, and means secured to said pipe and including means engageable with said ratchet teeth for advancing said ratchet assembly circumferentially relative to the pipe.

5. A device for cutting pipe comprising a plurality of pairs of arcuate elements having ratchet teeth thereon, said elements carrying pipe engaging rollers and being articulated at the axes of said rollers to provide a generally circular ratchet assembly, certain of said elements being provided with cutter guides, rotary cutters slidable in said guides, means for individually adjusting said cutters in said guides to advance the cutters against the pipe, and means engageable with said ratchet teeth for advancing said ratchet assembly circumferentially relative to the pipe.

6. A device for cutting pipe and the like, comprising a plurality of arcuate elements having exposed ratchet teeth and carrying pipe engaging rollers, said elements overlapping circumferentially and being articulated at the axes of the rollers to provide a generally circular ratchet assembly adapted to embrace a pipe or the like, certain of said elements having one or more of the teeth at one end thereof omitted at the region of its overlap by a succeeding element, whereby the teeth on the overlapping element alone are exposed at the region of overlap, so that the outline and spacing of the teeth at the overlap are substantially uniform and coincide substantially with the outline and spacing of other teeth on the elements, regardless of the number of elements employed, cutters mounted for radial adjustment in certain of said elements, means for individually adjusting said cutters to advance the same against a pipe, and means engageable with said ratchet teeth and actuable to advance said ratchet assembly circumferentially relative to the pipe.

7. A device for cutting pipe and the like, comprising a plurality of articulated arcuate elements having exposed ratchet teeth and carrying pipe engaging rollers, said elements overlapping circumferentially to provide a generally circular ratchet assembly adapted to embrace a pipe or the like, certain of said elements having one or more of the teeth at one end thereof omitted at the region of its overlap by a succeeding element, whereby the teeth on the overlapping element alone are exposed at the region of overlap, so that the outline and spacing of the teeth at the overlap are substantially uniform and coincide substantially with the outline and spacing of other teeth on the elements, regardless of the number of elements employed, cutters mounted for radial adjustment in certain of said elements, means for adjusting said cutters to advance the same against a pipe, and means engageable with said ratchet teeth and actuable to advance said ratchet assembly circumferentially relative to the pipe.

PRESTON E. HORD.